(12) United States Patent
Levy, Jr.

(10) Patent No.: US 6,305,329 B1
(45) Date of Patent: Oct. 23, 2001

(54) PRODUCT WITH IDENTIFICATION TAG

(76) Inventor: John C. Levy, Jr., 1825 Aston Ave., Carlsbad, CA (US) 92008

( * ) Notice: Subject to any disclaimer, the term of this patent is extended or adjusted under 35 U.S.C. 154(b) by 0 days.

(21) Appl. No.: 09/591,845

(22) Filed: Jun. 12, 2000

(51) Int. Cl.[7] ............... A01K 11/00; A01K 27/00; G09F 3/00; G09F 3/04
(52) U.S. Cl. ............... 119/858; 40/303; 40/630; 40/633; 283/81
(58) Field of Search .................. 119/858, 859, 119/860, 863, 865, 795, 792, 793; 283/81; 40/300, 299.1, 303, 626, 630, 633, 638

(56) References Cited

U.S. PATENT DOCUMENTS

| | | | |
|---|---|---|---|
| 2,979,840 | * | 4/1961 | Eastman . |
| 3,197,899 | * | 8/1965 | Twentier . |
| 3,645,023 | * | 2/1972 | Larson .................... 40/633 |
| 3,656,247 | * | 4/1972 | Bushnell et al. ........... 40/633 |
| 3,782,017 | * | 1/1974 | Graham .................... 40/303 |
| 3,871,336 | * | 3/1975 | Bergman ................... 359/516 |
| 3,889,411 | * | 6/1975 | Laugherty et al. .......... 40/633 |
| 4,159,586 | * | 7/1979 | Blum ...................... 40/299 |
| 4,178,879 | * | 12/1979 | Cunningham ................ 119/858 |
| 4,352,253 | * | 10/1982 | Oswalt .................... 119/858 |
| 4,956,931 | * | 9/1990 | Selke ..................... 40/633 |
| 5,083,979 | * | 1/1992 | Burt ...................... 462/3 |
| 5,364,132 | * | 11/1994 | Haas et al. ............... 283/67 |
| 5,860,235 | * | 1/1999 | Bilbie et al. ............. 40/594 |
| 5,862,101 | * | 1/1999 | Haas et al. ............... 368/327 |
| 5,865,470 | * | 2/1999 | Thompson .................. 283/70 |
| 5,900,307 | * | 5/1999 | Barcikowski ............... 428/203 |
| 6,024,213 | * | 2/2000 | Bush et al. ............... 206/296 |

* cited by examiner

*Primary Examiner*—Charles T. Jordan
*Assistant Examiner*—Yvonne R. Abbott
(74) *Attorney, Agent, or Firm*—Calif Tervo

(57) ABSTRACT

A combination of a product (70), such as a pet collar (70C), and an identification tag device (10) attached thereto that serves an alternate function. In the preferred embodiment, collar (70C) includes a buckle (80) having a recessed surface (84) adapted for attachment of an identification tag (30) and clear overlay (40). Three exemplary embodiments of the identification tag device (10) are: a display hanger (10H); a wrapper (10W); and an attached tag (10A). Each identification tag device (10) includes an identification tag (30) and a clear overlay (40) which may be peeled off and attached to collar (70C).

6 Claims, 2 Drawing Sheets

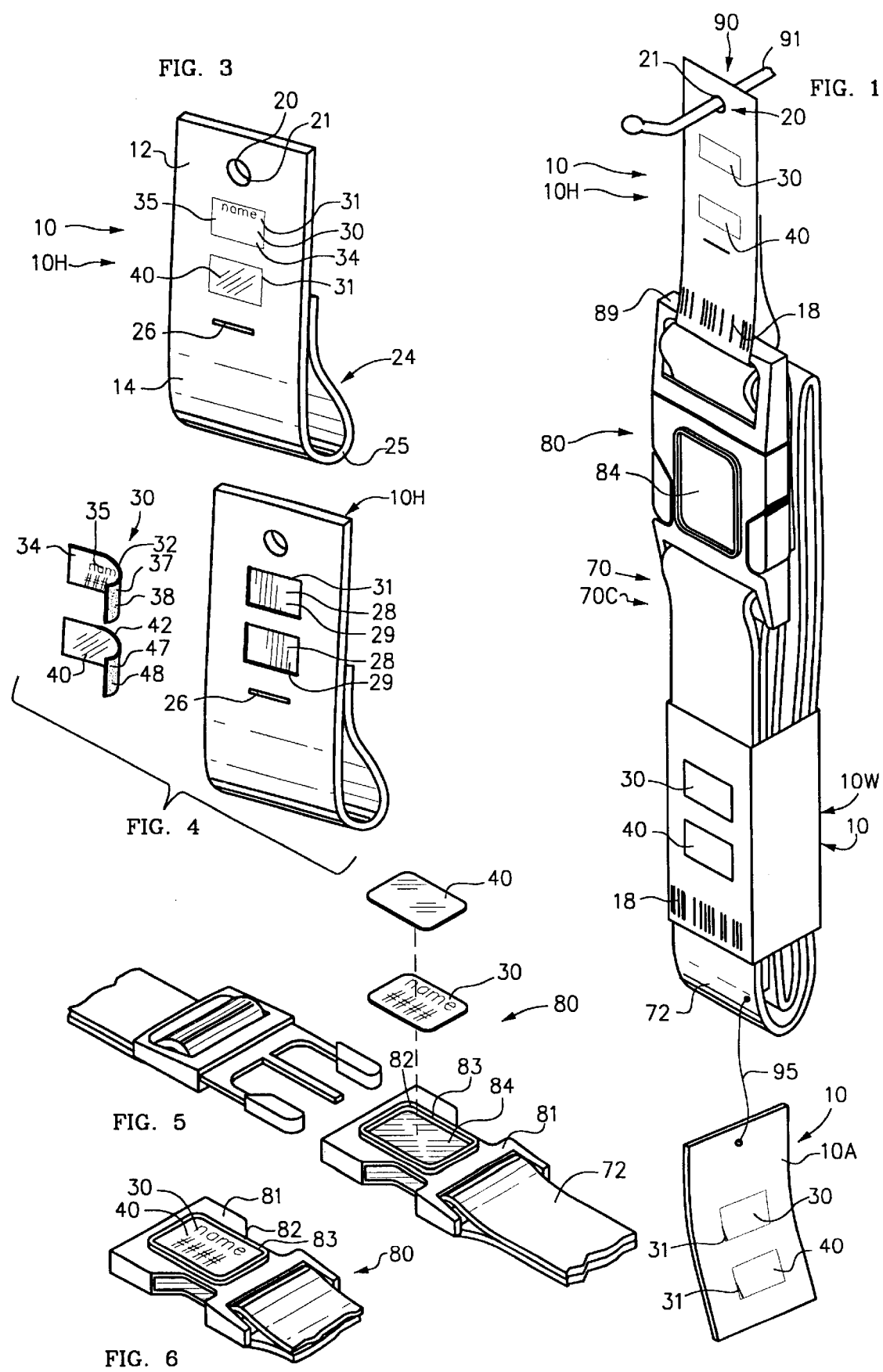

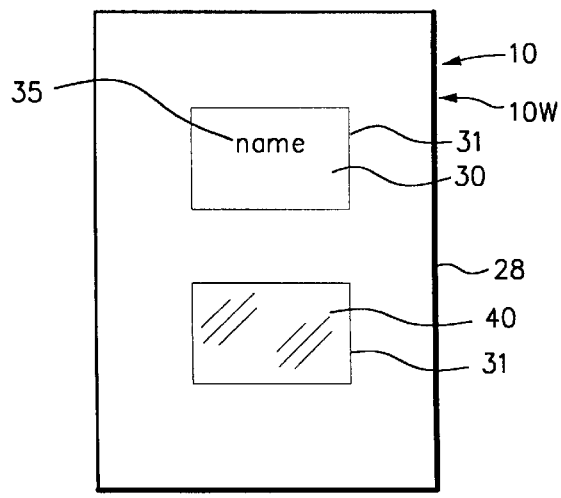
FIG. 7
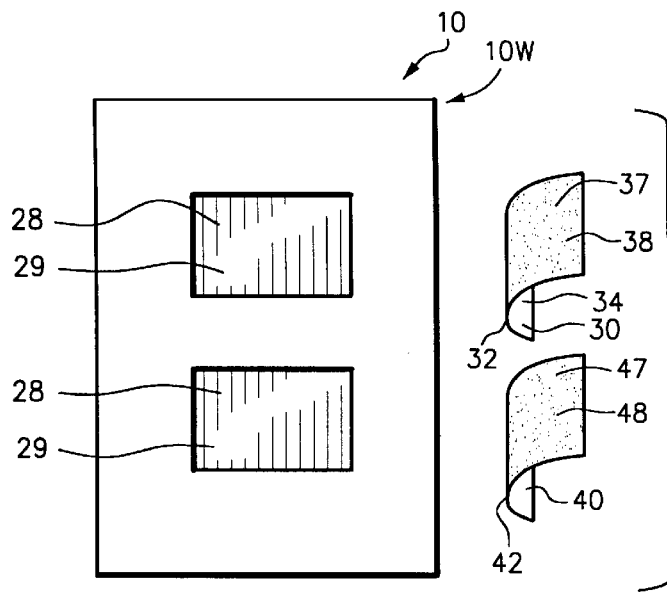
FIG. 8
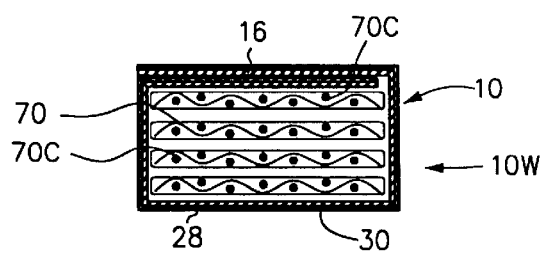
FIG. 9
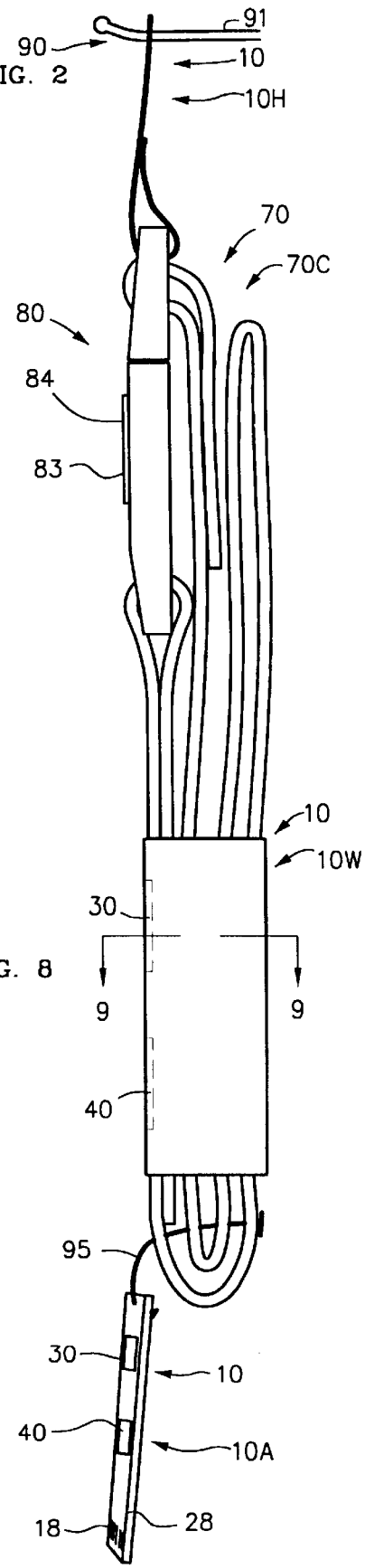
FIG. 2

PRODUCT WITH IDENTIFICATION TAG

FIELD OF THE INVENTION

This invention relates in general to the combination of a product and an identification tag device containing an identification tag that can readily be applied to the product, and more specifically to a multi-functional identification tag device.

SUMMARY OF THE INVENTION

This invention is a combination of a product, such as a pet collar, and an identification tag device attached thereto at point of sale. In the preferred embodiment, the collar includes a buckle having a recessed surface adapted for attachment of an identification tag and clear overlay.

Three exemplary embodiments of the identification tag device are shown: a display hanger; a wrapper; and an attached tag. Each identification tag device includes an identification tag and clear overlay for attachment to the collar. Each tag device is preferably a sheet comprised of layers of sheet material including a backing sheet with a smooth surface adapted to be adhesively removable from an adhesive layer, an identification tag and an overlay. The identification tag is fabricated of sheet material having a notational, or front, side and a back side. The front side includes free surface area that will readily accept identification data, such as by writing or typing. The back side has an adhesive layer thereon adhered to the smooth surface of the backing sheet. The identification tag is peeled from the smooth surface of backing along score lines and attached to the recessed surface of the buckle.

The overlay is fabricated of transparent sheet material having a back side having a transparent adhesive layer thereon adhered to the smooth surface of the backing sheet and placed over the identification tag after the identification data have been added to the identification tag.

The attached tag is attached, such as by a tether, to the collar. The display hanger is adapted both for hanging from a sales display and for attaching the collar. The wrapper is wrapped around the collar to configure the collar.

The features and advantages of the invention will be readily understood when the detailed description thereof is read in conjunction with the accompanying drawings wherein like reference numerals refer to like parts throughout.

BRIEF DESCRIPTION OF THE DRAWINGS

FIG. 1 is a perspective view of a product, such as a collar for a pet, with a wrapper and display hanger shown hanging from a sales display support.

FIG. 2 is an enlarged right side elevation view of the collar, wrapper, display hanger, and display support of FIG. 1.

FIG. 3 is an enlarged perspective view of the display hanger of FIG. 1.

FIG. 4 is a perspective view of the display hanger of FIG. 3 showing the tag and overlay removed from the backing.

FIG. 5 is an exploded perspective view of the collar buckle with recess and the identification tag.

FIG. 6 is a perspective view of the buckle showing the tag and overlay inserted in the recess.

FIG. 7 is an enlarged, front elevation view of the wrapper of FIG. 1.

FIG. 8 is an enlarged, front elevation view of the wrapper of FIG. 7 showing tag and overlay removed from the backing.

FIG. 9 is a sectional view of the wrapper taken on line 9—9 of FIG. 2.

DETAILED DESCRIPTION OF THE INVENTION

With reference now to the drawings, FIG. 1 is a perspective view of a product 70, such as a belt or collar 70C for a pet, and three identification tag devices 10, such as wrapper 10W, display hanger 10H, and attached tag 10A. Display hanger 10H hangs collar 70C from a sales display support 90, such as rod 91. FIG. 2 is an enlarged right side elevation view of collar 70C, wrapper 10W, display hanger 10H, attached tag 10A and display support 90 of FIG. 1.

Collar 70C generally includes a strap 72 for encircling a portion of an animal, such as the neck of a pet and a buckle 80, such as a snap buckle, for fastening collar 70C around the pet. Strap 72 or buckle 80 includes a tag receiving surface 84, such as on buckle 80, adapted for receiving an identification tag 30 from a tag device 10. The word "collar" is meant to include any belt or belt-like device that goes around a portion of an animal.

Turning to FIGS. 3 and 4, FIGS. 3 is an enlarged exploded perspective view of display hanger 10H of FIGS. 1 and 2. FIG. 4 is a perspective view of display hanger 10H of FIG. 3 showing identification tag 30 and the overlay 40 removed from the backing, or release layer 28.

The top 12 of hanger 10H includes hanging means 20, such as orifice 21, cooperating with display support rod 91 for hanging hanger 10H from rod 91. Orifice 21 receives rod 91 and hangs hanger 10H from rod 91. Other hanging means 20 are contemplated. For example, top 12 may be shaped in the form of a hook for hooking over a display support 90 or may simply be a surface upon which a clip or snap on display support 90 may be clipped or snapped to support hanger 10H.

The bottom 14 of hanger 10H includes attachment means 24, such as loop 25, for attaching hanger 10H to collar 70C. Loop 25 is threaded through a portion of collar 70C, such as through buckle loop 89 and attached to the hanger 10H by means well known in the art, such as by adhesive, interlocking slits or a fastener, such as staple 26, shown.

Display hanger 10H tag device 10 is preferably a sheet comprised of layers of sheet material. Hanger 10H includes a release liner 28, such as of siliconized densified kraft, including a surface, such as smooth release surface 29, adapted to be adhesively removable from an adhesive layer.

Identification tag 30 is fabricated of sheet material having a notational, or front, side 34 and a back side 37. Front side 34 includes free surface area that will readily accept identification data, such as by writing or typing and may be pre-imprinted with prompting indicia 35 such as "name" or "phone#". Back side 37 has an adhesive layer 38 thereon. Back side adhesive layer 38 of identification tag 30 is adhered to release surface 29 of release liner 28. Identification tag 30 is peeled along its peripheral edge 32 from release surface 29 of release liner 28 along perforations, serration, or score 31.

Overlay 40 is fabricated of transparent sheet material, such as transparent polyester sheet material, having a back side 47 having a transparent adhesive layer 48 thereon, such as of acrylic adhesive. Back side adhesive layer 48 is adhered to release surface 29 of release liner 28. Overlay 40 is peeled along its peripheral edge 42 from release surface 29 of release liner 28 along perforations, serration, or score 31.

FIGS. 5 and 6 show the mounted identification tag 30 and overlay 40. FIG. 5 is a perspective view of collar buckle 80 including an outward facing side 81 including a surface 84 for receiving identification tag 30. FIG. 6 is a perspective view of buckle 80 showing tag 30 and overlay 40 attached to surface 84. Surface 84 is adapted for receiving adhesive layer 38 of back side 37 of identification tag 30, which has been peeled from release liner 28 such that identification tag 30 is firmly attached thereto.

After the user has added identification data to front side 34 of identification tag 30 and affixed identification tag 30 to tag receiving surface 84, the user peels overlay 40 from release liner 28 and adheres overlay 40 by its adhesive layer 48 to front side 34, now containing identification data, of identification tag 30. Overlay 40 protects the identification data from damage or alteration.

Preferably, receiving surface 84 is recessed below a surrounding surface 82, such as the top of rim 83, such that tag 30 and overlay 40 lie below the surrounding surface 82 or below the top of the rim 83 and, thus, are protected from damage and such that, once attached, their peripheral edges 32, 42 are not accessible such that they 30, 40 cannot easily be peeled off buckle 80.

Returning once more to FIGS. 1 and 2, attached tag 10A is an alternate identification tag device 10. Attached tag 10A is attached to collar 70C, by any suitable means, such as a weak adhesive or plastic tether 95. Attached tag 10A is preferably a sheet comprised of layers of sheet material the same as or similar to hanger 10H including release liner 28 including a release surface 29, identification tag 30, and overlay 40. Release liner 28, identification tag 30 and overlay 40 function as described above with reference to hanger 10H. Attached tag 10A includes information generally found on a sales tag, such as UPC bar code 18, price, etc.

FIGS. 7, 8 and 9 show an alternate embodiment of identification tag device 10, such as wrapper low. FIG. 7 is an enlarged, front elevation view of wrapper 10W of FIG. 1. FIG. 8 is an enlarged front elevation view of wrapper 10W of FIG. 7 showing tag 30 and overlay 40 removed from release liner 28. FIG. 9 is a sectional view of wrapper 10W taken on line 9—9 of FIG. 2.

Collar 70C is flexible and configurable, such as by folding, crumpling or bending, into multiple configurations. Wrap low encircles collar 70C and is attached to itself 10W, such as with adhesive 16 such that collar 70C is held in a given configuration.

Wrap 10W is preferably a sheet comprised of layers of sheet material the same as or similar to hanger 10H including release liner 28 including a release surface 29, identification tag 30, and overlay 40. Release liner 28, identification tag 30 and overlay 40 function as described above with reference to hanger 10H.

The invention provides a very convenient and reliable manner of including an identification tag with a product.

Although particular embodiments of the invention have been illustrated and described, various changes may be made in the form, composition, construction, and arrangement of the parts herein without sacrificing any of its advantages. Therefore, it is to be understood that all matter herein is to be interpreted as illustrative and not in any limiting sense, and it is intended to cover in the appended claims such modifications as come within the true spirit and scope of the invention.

I claim:

1. In combination:

a strap for encircling a portion of an animal; said strap including
   a tag receiving surface adapted for receiving an identification tag;

a tag device including:
   attachment means for attaching said tag device to said strap;
   a release liner including a surface adapted to be adhesively removable from an adhesive layer;
   an identification tag fabricated of sheet material having:
     a front side that will readily accept identification data; and
     a back side having an adhesive layer thereon; said back side adhesive layer of said identification tag adhered to said release liner; and
   an overlay fabricated of transparent sheet material including:
     a back side having a transparent adhesive layer thereon; said back side adhesive layer of said overlay adhered to said release liner; such that a user may add data to said front side of said identification tag; peel said tag from said release liner, peel said overlay from said release liner; adhere said overlay by its said adhesive layer to said front side containing data of said identification tag; and adhere said identification tag by its said adhesive layer to said tag receiving surface of said strap.

2. The combination of claim 1 wherein:

said receiving surface is recessed below the surrounding surface such that said identification tag and said overlay lie below said surrounding surface when placed in said recess.

3. The combination of claim 1 wherein:

said receiving surface is surrounded by a rim that includes a top that is higher than said identification tag and said overlay when they are attached to said surface.

4. The combination of claim 1 wherein:

said strap includes a buckle; and said receiving surface is on said buckle.

5. The combination of claim 1 wherein:

said strap is a collar for a pet.

6. The combination of claim 1 wherein:

said strap includes a buckle; and said receiving surface is on said buckle and is recessed below the surrounding surface such that said identification tag and said overlay lie below said surrounding surface when placed in said recess.

\* \* \* \* \*